US011957975B2

(12) United States Patent
Bronder et al.

(10) Patent No.: US 11,957,975 B2
(45) Date of Patent: Apr. 16, 2024

(54) DEAD RECKONING AND LATENCY IMPROVEMENT IN 3D GAME STREAMING SCENARIO

(71) Applicant: Microsoft Technology Licensing, LLC, Redmond, WA (US)

(72) Inventors: Matthew Lawrence Bronder, Bellevue, WA (US); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 15/989,011

(22) Filed: May 24, 2018

(65) Prior Publication Data

US 2019/0358541 A1    Nov. 28, 2019

(51) Int. Cl.
*A63F 13/358* (2014.01)
*G06T 1/20* (2006.01)
(Continued)

(52) U.S. Cl.
CPC .............. *A63F 13/358* (2014.09); *G06T 1/20* (2013.01); *G06T 3/0056* (2013.01); *G06T 7/50* (2017.01);
(Continued)

(58) Field of Classification Search
CPC . A63F 13/358; H04L 65/4069; H04L 65/602; H04L 67/38; H04N 19/513;
(Continued)

(56) References Cited

U.S. PATENT DOCUMENTS 8,463,020 B1 * 6/2013 Schuckmann .......... G06T 11/00
348/36
2003/0130040 A1 * 7/2003 Dripps .................... A63F 13/31
463/42

(Continued)

FOREIGN PATENT DOCUMENTS

WO    2008139515 A1    11/2008
WO    2016191136 A1    12/2016

OTHER PUBLICATIONS

Mark et al, "Post rendering image warping for latency compensation", Jan. 10, 1996, UNC-CH Computer Science Technical Report, #96-020, pp. 1-6.*

(Continued)

*Primary Examiner* — Shawn S An
(74) *Attorney, Agent, or Firm* — ARENTFOX SCHIFF LLP

(57) ABSTRACT

Examples described herein generally relate to systems and method for streaming a video game at a client device. The client device may transmit video game controls to a streaming server. The client device may receive a video stream encoding video images generated in response to the video game controls from the streaming server. The client device may determine that a video image of the video stream to display in a frame has not been completely received at a designated time prior to display of the frame. The client device may determine an image transformation based on a history of the video images and motion vectors for the video stream. The client device may apply the image transformation to a portion of one or more images corresponding to previous frames. The client device may display a substitute video image in the frame including the portion of the transformed image.

21 Claims, 5 Drawing Sheets

(51) Int. Cl.
  *G06T 3/00*  (2006.01)
  *G06T 7/50*  (2017.01)
  *H04L 65/61*  (2022.01)
  *H04L 65/75*  (2022.01)
  *H04L 67/131*  (2022.01)
  *H04N 19/513*  (2014.01)
  *H04N 19/895*  (2014.01)

(52) U.S. Cl.
  CPC ............ *H04L 65/61* (2022.05); *H04L 65/762* (2022.05); *H04L 67/131* (2022.05); *H04N 19/513* (2014.11); *H04N 19/895* (2014.11); *G06T 2207/10016* (2013.01); *G06T 2207/20081* (2013.01)

(58) Field of Classification Search
  CPC ....... H04N 19/895; G06T 7/50; G06T 3/0056; G06T 1/20
  See application file for complete search history.

(56) References Cited

U.S. PATENT DOCUMENTS

| | | | | |
|---|---|---|---|---|
| 2005/0046700 | A1* | 3/2005 | Bracke | H04N 13/139 348/E13.059 |
| 2006/0230428 | A1* | 10/2006 | Craig | A63F 13/338 725/133 |
| 2009/0015679 | A1* | 1/2009 | Hayakawa | G06T 13/20 348/207.1 |
| 2009/0167961 | A1* | 7/2009 | Suzuki | G09G 5/00 348/718 |
| 2010/0166056 | A1* | 7/2010 | Perlman | A63F 13/86 375/240.01 |
| 2012/0004042 | A1* | 1/2012 | Perry | A63F 13/358 463/42 |
| 2013/0300730 | A1* | 11/2013 | Chen | H04N 13/337 345/87 |
| 2015/0281029 | A1* | 10/2015 | Callahan | A63F 13/358 709/224 |
| 2015/0318872 | A1* | 11/2015 | Mani | H04M 7/0084 714/774 |
| 2017/0352334 | A1* | 12/2017 | Li | G06T 1/60 |
| 2018/0101930 | A1 | 4/2018 | Kopf et al. | |
| 2018/0293697 | A1* | 10/2018 | Ray | G06F 9/3851 |
| 2018/0374187 | A1* | 12/2018 | Dong | G06F 9/46 |
| 2019/0043199 | A1* | 2/2019 | Zhao | G06K 9/00375 |
| 2019/0141085 | A1* | 5/2019 | Tsaplin | H04N 21/41415 |

OTHER PUBLICATIONS

Shi et al, "Real-time Remote Rendering of 3D video for Mobile Devices", Oct. 19, 2009, University of Illinois Dept of Computer Science, 17th ACM International Conference, pp. 1-10.*

Evangelakos, et al., "Extended TimeWarp Latency Compensation for Virtual Reality", In Proceedings of the 20th ACM SIGGRAPH Symposium on Interactive 3D Graphics and Games, Feb. 27, 2016, pp. 193-194.

Mark, et al., "Post-Rendering 3d Warping", In Proceedings of Symposium on Interactive 3D Graphics, Apr. 27, 1997, pp. 7-16.

Mark, et al., "Post-Rendering Image Warping for Latency Compensation UNC-CH Computer Science", Retrieved From: https://pdfs.semanticscholar.org/0b7b/e45c1b79cb72d5452f260a2b88f0d3adb6bf.pdf?_ga~2.1338553.960745667.1561619607-595585313.1549276027, Jan. 10, 1996, 6 Pages.

"International Search Report and Written Opinion Issued in PCT Application No. PCT/US2019/031920", dated Oct. 9, 2019, 16 Pages.

Shi, et al., "Real-Time Remote Rendering of 3d Video For Mobile Devices", In Proceedings of the 17th ACM International Conference on Multimedia, Oct. 19, 2009, 10 Pages.

Vijayanarasimhan, et al., "SfM-Net: Learning of Structure and Motion from Video", In the Computing Research Repository, Apr. 25, 2017, 9 Pages.

"Office Action Issued in European Patent Application No. 19726280.1", dated Aug. 18, 2022, 5 Pages.

"Summons to Attend Oral Proceedings Issued in European Patent Application No. 19726280.1", Mailed Date: May 2, 2023, 8 Pages.

"Office Action Issued in Japnese Patent Application No. 2020-564883", Mailed Date: May 16, 2023, 16 Pages.

"Office Action Issued in Japanese Patent Application No. 2020-564883", Mailing Date: Nov. 14, 2023, 20 Pages.

Office Action received for European Application No. 19726280.1, mailed on Jan. 4, 2024, 8 pages.

Office Action Received for Korean Application No. 10-2020-7036006, mailed on Feb. 16, 2024, 06 pages (English Translation Provided).

* cited by examiner

DEAD RECKONING AND LATENCY IMPROVEMENT IN 3D GAME STREAMING SCENARIO

BACKGROUND

The present disclosure relates to streaming video games, and more particularly, to mitigating latency in streaming video games.

A streaming video game may be defined as a video game in which a client device provides control commands to a server running the game via a network, the server acts on the control commands to generate a video stream, which is sent to the client device via the network for display on a screen of the client device. Streaming video games may differ from more conventional video games where the client device renders the video images that are presented to the user, even if a server performs some processing. For example, in a multiplayer game, the server may calculate interactions between players, but the server typically sends scene information to the client device to render the video images. Streaming video games may offer an advantage of centralizing game processing and allowing a thinner, less-complex client device and less-complex client software compared to running the game on the client device. For example, streaming video games may be suitable for mobile devices, which may lack dedicated graphics processing cards.

Streaming video games may experience difficulties with latency and latency variation (jitter) of the communications network used to stream the video. That is, the client device may not receive a video packet at an intended time due to network latency. The actual time of receiving the video packet may be difficult to predict due to jitter. In particular, wireless networks, although providing sufficient bandwidth to stream video, may experience greater latency and jitter compared to wireline networks having similar bandwidth.

Unlike conventional streaming video (e.g., movies), buffering may not work for streaming video games because the video is based on user input, so video images to present in future frames are not available in advance. Additionally, unlike a conventional multi-player game where the client device runs a parallel game engine, the client device for a streaming game may not have information for a current game state. Therefore, a client device may freeze when no new video image is received for display.

Thus, there is a need in the art for improvements in graphics processing for video game streaming on computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device for playing a streaming video game. The computer device may include a memory storing data and instructions, a central processing unit in communication with the memory, a network interface communicatively coupled with a communications network, a client application, and a display control component. The computer device may be operable to transmit video game controls to a streaming server via the network interface. The computer device may be operable to receive a video stream encoding video images generated in response to the video game controls from the streaming server via the network interface. The computer device may be operable to determine that a video image of the video stream to display in a frame has not been completely received at a designated time prior to display of the frame. The computer device may be operable to determine an image transformation based on at least a history of the video images and motion vectors for the video stream. The computer device may be operable to apply the image transformation to at least a portion of one or more images corresponding to one or more previous frames to generate a substitute video image. The computer device may be operable to display the substitute video image in the frame including at least the portion of the transformed image in response to the determination that the video image to display in the frame was not completely received at the designated time.

Another example implementation relates to a method for playing a streaming video game on a computer device. The method may include transmitting video game control commands to a streaming server. The method may include receiving, from the streaming server, a video stream encoding video images generated in response to the video game controls. The method may include determining that a video image of the video stream to display in a frame has not been completely received at a designated time prior to display of the frame. The method may include determining an image transformation based on at least a history of the video images and motion vectors for the video stream. The method may include applying the image transformation to at least a portion of one or more images corresponding to one or more previous frames to generate a substitute video image. The method may include displaying the substitute video image in the frame including at least the portion of the transformed previously displayed image in response to the determination that the video image to display in the frame was not completely received at the designated time.

Another example implementation relates to a computer-readable medium including code executable by one or more processors for playing a streaming video game on a computing device. The computer-readable medium may include code for transmitting video game controls to a streaming server. The computer-readable medium may include code for receiving, from the streaming server, a video stream encoding video images generated in response to the video game controls. The computer-readable medium may include code for determining that a video image of the video stream to display in a frame has not been completely received at a designated time prior to display of the frame. The computer-readable medium may include code for determining an image reprojection based on at least an image of the video stream corresponding to a previous frame and motion vectors selecting based on a camera transformation matrix for the previous frame. The computer-readable medium may include code for applying the image reprojection to at least a portion of one or more images of the video stream corresponding to one or more previous frames to generate a substitute video image. The computer-readable medium may include code for displaying the substitute video image in the frame including at least the portion of the reprojected image in response to the determination that the video image to display in the frame was not completely received at the designated time.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
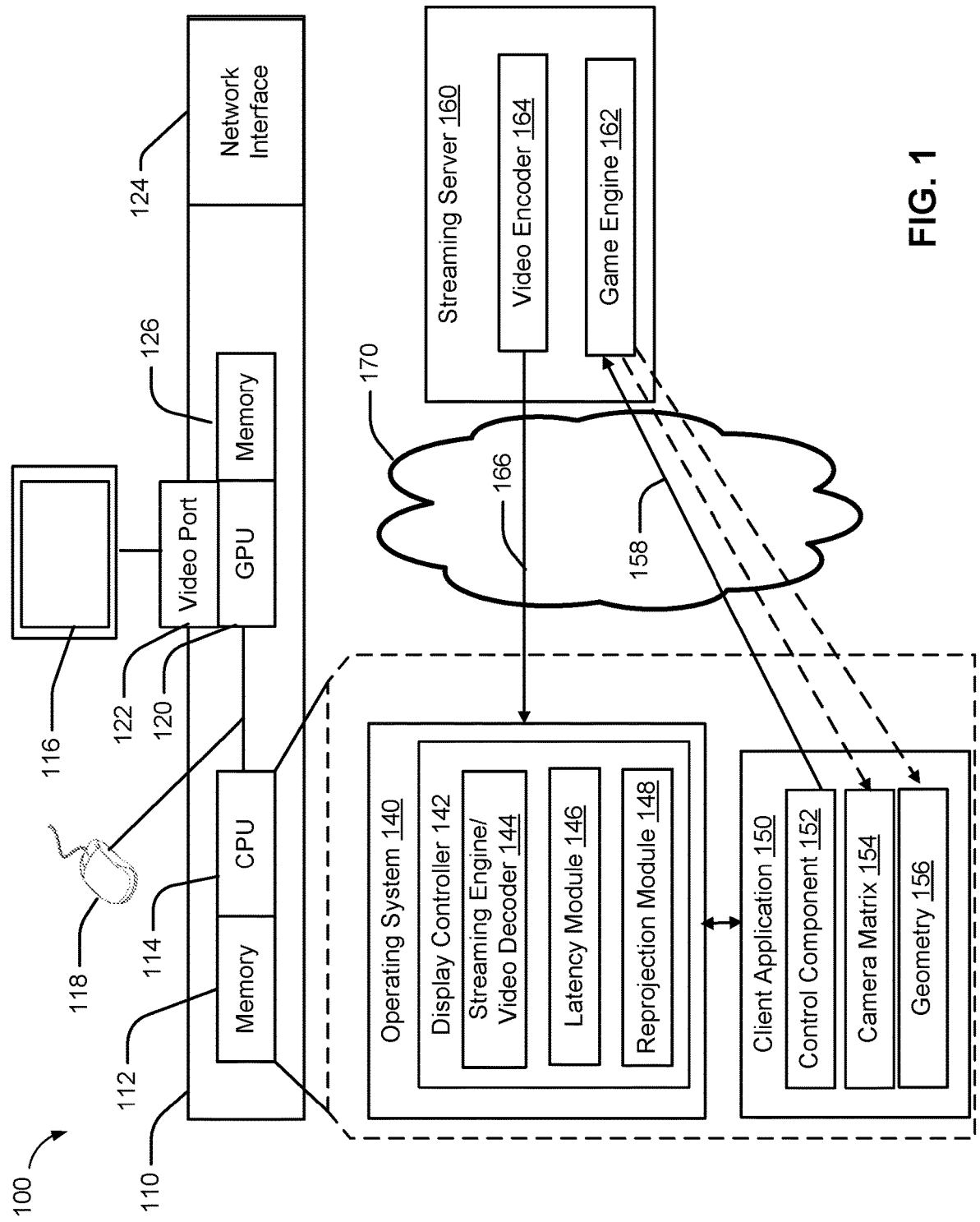
FIG. 1 is a schematic block diagram of an example system for playing a streaming video game, in accordance with an implementation of the present disclosure.

The present disclosure provides systems and methods for streaming video games. As used herein, the term streaming video game refers to an arrangement where a streaming server executes a video game, generates images, and sends a video stream encoding the images to a streaming client device. The streaming server may generate the images by performing a rendering process for the streaming client device. The streaming server, however, may not actually display the generated images on a screen or monitor. Instead, the streaming server may encode the images as the video stream. The video stream may encode images corresponding to video frames. A frame may be a sequential period of time for displaying an image. The encoding may include images and/or change information (e.g., motion vectors) that indicate the image corresponding to each frame. For network communications, the encoded video stream may be divided into multiple video packets, each video packet including a portion of the video stream. Video packets may be lost in transit, may arrive out of order, or may be delayed such that the time for displaying the corresponding frame has passed when the video packet arrives.

In an implementation, for example, this disclosure provides systems and methods for reducing the effects of network latency on a user's experience at the streaming client device. In particular, the disclosure addresses the problem of the streaming client device not receiving video packets in time to present an image corresponding to a frame on a display of the streaming client device. The disclosure provides a dead reckoning approach in which a substitute image is generated based on a history of the generated images and motion vectors of the video stream when one or more video packets are not received in time.

The streaming client device may determine that at least a portion of video data (e.g., one or more video packets) for displaying a video frame has not been received at a time prior to displaying the video frame. The streaming client device may determine an image transformation based on a history of video frames and motion vectors of the video stream. The streaming client may apply the image transformation to at least a portion of one or more previous frames to generate a substitute video frame. If the video data has not arrived at a display time, the streaming client may display the substitute video frame in place of the unreceived video frame. Accordingly, instead of freezing the image on the display when no new video frame is available, the streaming client may predict what the missing video frame may look like as a substitute image. Although the predicted substitute image is unlikely to be an exact duplicate of the missing image, the substitute may improve the user experience by filling in the video frame to smooth out movement. Once the streaming client receives current video packets, the streaming client may display the video stream from the server in the correct frames based on the current video packets.

Determining the image transformation may be performed by the operating system of the streaming device with or without assistance of a video game client application. Without assistance of the video game client application, the operating system may analyze the video stream to determine the image transformation. For example, the video stream may be encoded to include images and/or motion vectors indicating a transformation of certain pixels between images. The operating system may analyze the images to identify objects and estimate depth of the objects. The operating system may then extrapolate the motion vectors from the images of the previous frames to a current frame corresponding to the unreceived image to determine an image transformation.

With assistance of the video game client application and/or the streaming server, the operating system may improve the image transformation using known information about the images. For example, the video game may provide a camera matrix indicating a pose of a virtual camera and changes of the pose. Since the camera pose may be a major source of movement between video frames, the camera matrix may be used to more accurately predict the image transformation. As another example, the video game may provide some information about the geometry of the video game image. For instance, the video game may identify locations of objects. The operating system may cache object textures and apply the cached textures to objects after the image transformation.

Referring now to FIG. 1, an example computer system 100 may include a computer device 110 that provides video images for presentation on a display 116 in corresponding video frames and a streaming server 160 that streams a video game to the computer device 110. The streaming server 160 may include a game engine 162 that processes various inputs (e.g., control commands 158) from one or more users and updates a game state. The game state may refer to the state of any feature of the video game such as an environment, characters, objects, or properties thereof. The streaming server 160 may also include a video encoder 164 that generates and encodes a video stream 166 for a computer device 110. The video stream 166 may encode images generated for a particular user, for example, based on a point of view of the user's character or including information conveying applicable elements of the game state for the user. The streaming server 160 may be implemented, for example, as one or more hardware computer servers or as one or more virtual servers provided by a cloud service.

Computer device 110 may include any mobile or fixed computer device, which may be connectable to a network for streaming the video game. Computer device 110 may be, for example, a computer device such as a desktop or laptop or tablet computer, a cellular telephone, a gaming console/device, a mixed reality or virtual reality device, a music device, a television, a navigation system, a camera, a personal digital assistant (PDA), or a handheld device, or any other computer device having wired and/or wireless connection capability with one or more other devices.

Computer device 110 may include a memory 112 and CPU 114 configured to control the operation of computer device 110. Memory 112 may be configured for storing data and/or computer-executable instructions defining and/or associated with an operating system 140 and/or client application 150, and CPU 114 may execute operating system 140 and/or client application 150, which may be a streaming game client application. An example of memory 112 can include, but is not limited to, a type of memory usable by a computer, such as random access memory (RAM), read only memory (ROM), tapes, magnetic discs, optical discs, volatile memory, non-volatile memory, and any combination thereof. Memory 112 may store local versions of applications being executed by CPU 114.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit.

The display 116 may be connected to a video port 122 in communication with the CPU 114 and a graphics processing unit (GPU) 120 of the computer device 110. Image processing may be divided between the CPU 114 and the GPU 120 in a manner that provides for determination and application of an image transformation. For example, the CPU 114 may determine when an image transformation is to be applied and the GPU 120 may apply an image transformation to each pixel of one or more previous images.

Computer device 110 may also include an input device 118 for receiving input from a user. The input device 118 may include, for example, a mouse, keyboard, touchscreen, touchpad, button, game controller, digital pen, head mounted display, wearable device, or other device that provides input.

Computer device 110 may also include the video port 122 integrated with the CPU 114 and/or GPU 120. The video port 122 may be, for example, a VGA, DVI, HDMI, or DisplayPort output. The video port 122 may provide a video signal that may be utilized by the display 116, which may include a monitor or a virtual reality head mounted display (HMD). For example, the video port 122 may periodically scan out a video buffer in the GPU memory 126. The CPU 114, GPU 120, and video port 122 may perform general graphics processing operations for the computer device 110.

The computer device 110 may also include a network interface 124, which may include any wired or wireless network interface (e.g., Ethernet or Wi-Fi). As another example, computer device 110 may optionally include a universal serial bus (USB) interface. The network interface 124 of computer device 110 may be connected to a corresponding network interface of the streaming server 160 via a network 170. The network 170 may be a communications network that transmits packets. For example, the network 170 may be a local area network (LAN), wide area network (WAN), or the Internet. The network 170 may utilize various protocols including Internet protocol (IP). Accordingly, the computer device 110 may transmit and receive data (e.g., data packets) to and from the streaming server 160 via the network 170.

The network 170 may contribute to latency of communications. Latency in the context of a streaming video game may refer to a duration of a time period between the user making an input and the user seeing the image updated on their screen (e.g., display 116). High latency can make games unplayable. Latency in a streaming situation includes many components including network latency, rendering time, image encoding time, etc and may be upwards of 100 ms. Another property of network communications is jitter. Jitter measures the variability of latency. From the perspective of a player of a streaming video game, jitter shows up as uneven reaction to the inputs and may result in a jarring gaming experience. Generally wireless networks such as wi-fi and mobile networks have high jitter in comparison to wired networks. Bandwidth may refer to how much data per second on average can be transmitted between client (e.g., computer device 110) and server (e.g., streaming server 160). Bandwidth may be asymmetric, usually being much lower from client to the server than in the opposite direction. Lossy network protocols such as user datagram protocol (UDP) are usually used for network streaming. This is because protocols with error checking and correction such as transport control protocol (TCP) have worse latency guarantees. Usage of protocols like UDP may result in some number of packets being lost in transmission.

The operating system 140 may include instructions (such as client application 150) stored in memory 112 and executed by the CPU 114. The operating system 140 may include a display controller 142 for controlling the GPU 120. For example, the display controller 142 may provide control commands to the GPU 120 to perform one or more specific graphics processing operations such as rendering source images or performing adjustments. The display controller 142 may include a streaming engine 144 for receiving and decoding a video stream 166, a latency module 146 for detecting a delay in the video stream 166, and a reprojection module 148 for generating an image adjustment to be applied to one or more images in one or more previous video frames when a current video frame is not received.

The computer device 110 may also include a client application 150 including instructions stored in memory 112 and executed by the CPU 114. The application 150, for example, may be a streaming video game client application that communicates with a streaming server 160. For example, the application 150 may include a control component 152 that receives user input from a user and transmits control commands 158 to the streaming server 160. In an implementation, the application 150 may also maintain some state information about the video game. For example, the application 150 may maintain a camera matrix 154 indicating a pose of a camera. The application 150 may update the camera matrix 154 based on a server camera matrix received from the streaming server 160. Additionally, in an implementation, the application 150 may include geometry 156 indicating the geometry of one or more objects that may be rendered in a video frame. In some implementations, the application 150 may provide the camera matrix 154 and/or geometry 156 to the reprojection module 148 to determine the image transformation.

Figure 2:
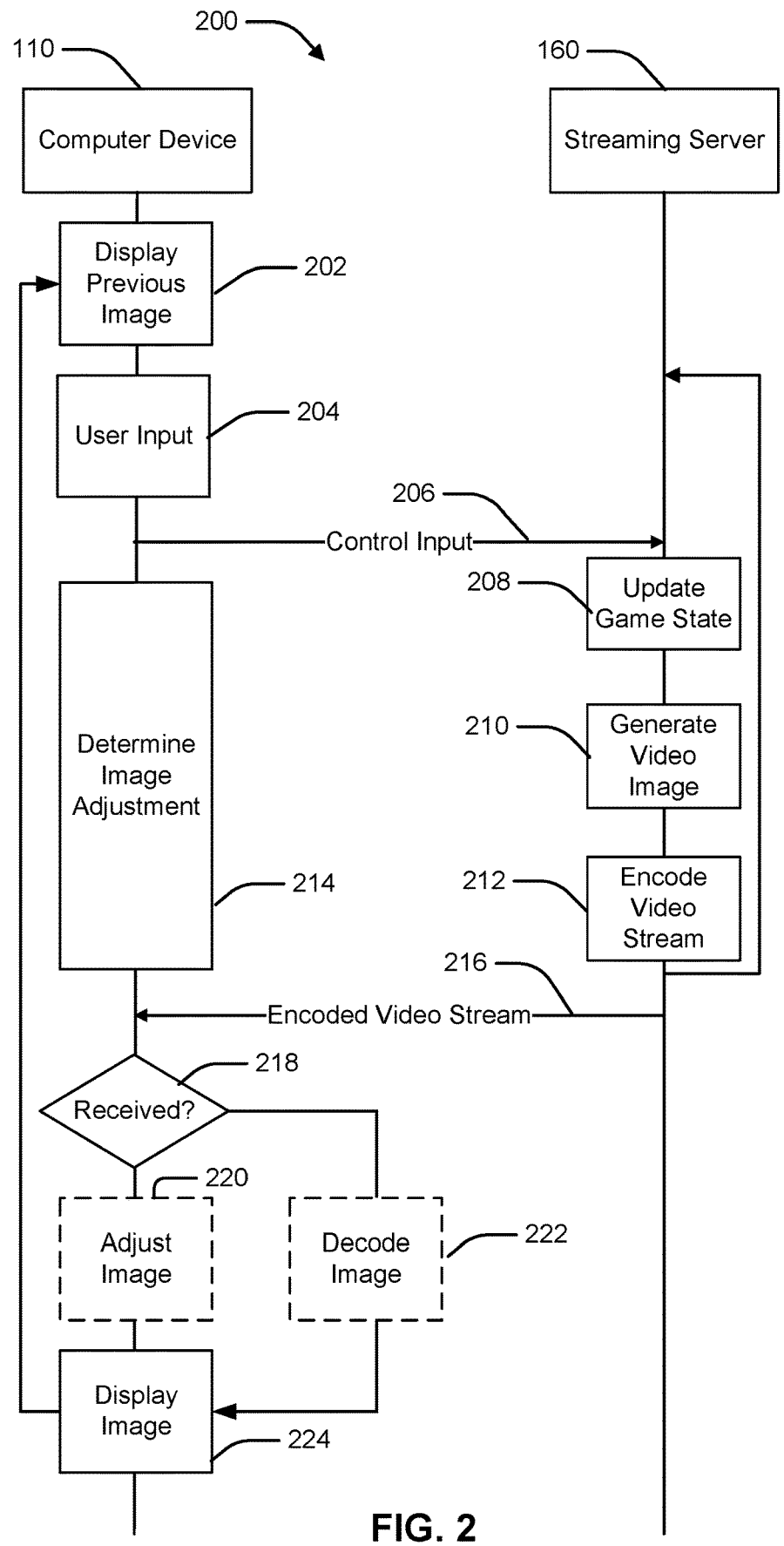
FIG. 2 is a diagram illustrating processes and communications for playing the streaming video game, in accordance with an implementation of the present disclosure.

Referring now to FIG. 2, a diagram 200 shows an example timing of processing and communications at the computer device 110 and the streaming server 160. At 202, the computer device 110 (e.g., GPU 120 and display 116) may display a previous image. The previous image may correspond to a previous frame in a video stream. The previous image may be based on, for example, received video information from the streaming server. As discussed in further detail below, the previous image may also be based on an image transformation applied to another video frame. In either case, the previous image may refer to an image that has been displayed on the display 116, for example, in a previous frame. Additionally, video packets for an image to be displayed in a frame may arrive late. Although an image may arrive too late to be displayed in the correct frame, the image may be used in an image transformation and may be referred to as an image corresponding to a previous frame.

At 204, the computer device 110 (e.g., control component 152) may receive user input from a user for controlling the video game. For example, the input may be provided via the input device 118 (e.g., mouse, keyboard, touchscreen, controller, or other device that enables user interaction). At 206, the control component 152 may pass the user input on to the streaming server 160 as control commands 158. The control commands 158 may be raw input (e.g., mouse movement and button presses) or the control component 152 may perform some processing of the input. For example, the control component 152 may convert mouse movement or button presses into game commands. That is, instead of transmitting raw input data, the control component 152 may transmit a game command such as a command to move a character forward or activate an ability. Accordingly, the control commands 158 may include one or both of raw input and game commands.

At 208, the streaming server 160 may perform a game state update. The game state update may include any commands executed by the game engine 162. For example, the game state update may include interactions between one or more users, the environment, and objects. The game state update may be based on the control commands 158.

At 210, the streaming server 160 may perform video rendering for each user. The streaming server 160 may generate an image based on a camera view of the user. For example, the camera view may include the environment and any objects viewable by a user's character. The streaming server 160 may not necessarily display the generated images at the streaming server 160. The streaming server 160 may generate the image in a memory.

At 212, the streaming server 160 may perform video encoding of the rendered video images. Various video encoding techniques are known in the art to reduce a size of the video for transmission. Such video encoding is important to streaming video games to reduce the network bandwidth used by the game. The video encoding technique may produce various descriptive data that may be decoded to regenerate encoded images. For example, the video encoding may include motion vectors for groups of pixels or objects.

At 214, the computer device 110 may determine an image adjustment to be applied to one or more previous images. The computer device 110 may determine the image adjustment concurrently with the processing at the streaming server 160. Accordingly, the computer device 110 may have the image adjustment available at the time when the packets for the next video frame are intended to arrive at 216.

At 218, the computer device 110 may determine whether video packets for the next video frame have been received. The action 218 may occur at a designated time prior to display of the next video frame. For example, the designated time may be a time that allows decoding of the video packets and/or performing an image adjustment. If all of the video packets have been received at the designated time, the computer device 110 may decode the image based on the received video packets at 222. If the video packets have not been timely received by the designated time, at 220, the computer device 110 may apply the determined image adjustment to one or more images associated with one or more previous frames to generate a substitute image. In an implementation, the decision at action 218 may occur before either adjusting the image at action 220 or decoding the image at action 222. Since both actions 220 and 222 may utilize the same resources (e.g., GPU 120 and memory 126) determining which action to perform may conserve resources. In alternative implementations, both actions 220 and 222 may be performed to attempt to generate two images. If the decoding process fails (e.g., because the video packets were not timely received), the substitute image may be selected.

At 224, the computer device 110 may display the substitute image if the video packets were not timely received by the designated time or display the received image if the video packets were timely received. Accordingly, the computer device 110 may display either the image generated by the streaming server or the substitute image depending on whether the video packets were timely received. For example, in situations with high latency, the computer device 110 may display the substitute image.

Figure 3:
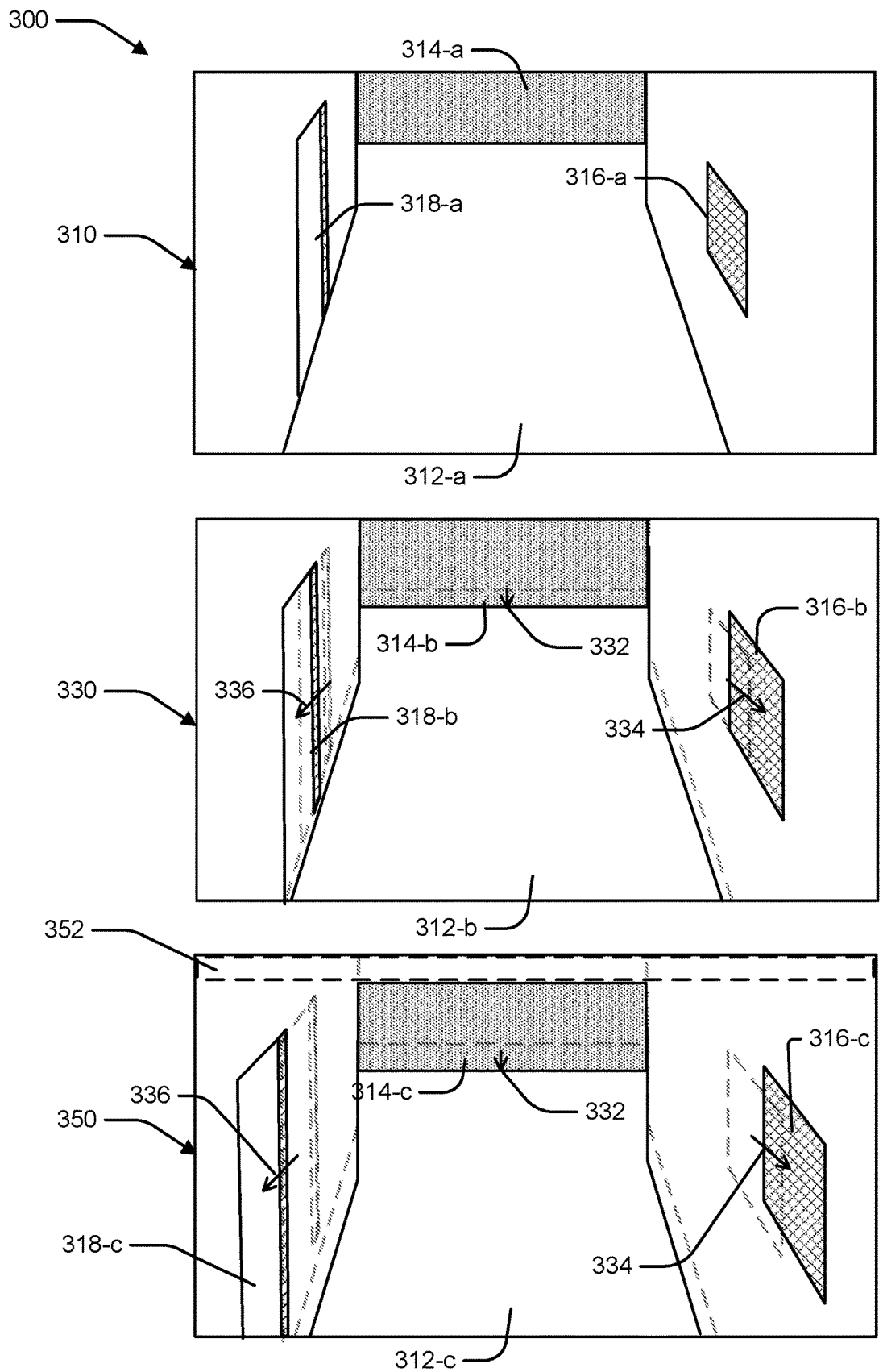
FIG. 3 is an example of a video stream of a streaming video game including a substitute video frame, in accordance with an implementation of the present disclosure.

Referring now to FIG. 3, an example video stream 300 includes video frames 310, 330, and 350. Video frames 310 and 330 may be streamed frames generated by the streaming server 160. Video frame 350 may be a substitute frame generated by the computer device 110 if a corresponding video frame does not arrive from the streaming server 160 in time for display.

As an example, the video frame 310 may include an image of a corridor 312-*a* intersecting a perpendicular corridor and ending at a wall 314-*a*. For instance, the video game may allow a user to control a character that walks along the corridor 312-*a*. The corridor 312-*a* may be defined by a left wall and a right wall. The right wall may include a window 316-*a*, and the left wall may include a doorway 318-*a*.

The video frame 330 may be a next video frame following the video frame 310. For example, the video frame 330 may be generated if the control command 158 moves the character forward. In video frame 330, the previous location of each object (e.g., in video frame 310) is shown in dashed lines. Motion vectors 332, 334, 336 are shown as arrows indicating the direction and magnitude of movement. For example, the wall 314-*b* may have moved downward in the video frame 330 as indicated by motion vector 332 while the window 316-*b* may have moved downward and to the right as indicated by motion vector 334 and the doorway 318-*b* may have moved downward and to the left as indicated by motion vector 336. The size of the wall 314-*b*, window 316-*b*, and doorway 318-*b* in video frame 330 may also increase as the camera moves closer to each of the objects. The size information may also be included in the video encoding.

The video encoding of the video frame 330 may identify each of the wall 314-*b*, window 316-*b*, and doorway 318-*b* as groups of pixels and indicate the corresponding motion vectors 332. Since most of the pixels are the same in video frame 310 and video frame 330, providing the moving groups of pixels and the motion vectors may provide significant compression for the video encoding.

The motion vectors 332 of the video encoding may also be used to determine an image transformation to generate a substitute image, which may be displayed as video frame 350 if video packets are not timely received from the streaming server 160. The video frame 350 illustrates an example substitute image based on the motion vectors 332,

334, 336. For example, in one implementation, the image transformation may include applying the motion vectors 332, 334, 336 to the same objects or groups of pixels as in the previous frame. As illustrated, in video frame 350, the wall 314-c may be moved further down, the window 316-c may be moved further down and to the right, and the doorway 318-c may be moved further down and to the left. Pixels that extend beyond the screen space after the image transformation may not be drawn. For example, the portion of the doorway 318 extending past the bottom edge may not be displayed. Applying the motion vectors from the previous video frame 330 may also result in an area 352 with no color information because all of the pixels in the area 352 have been moved and no new information has been received. The computer device 110 may use best efforts to guess what colors to use for area 352 based on adjacent groups of pixels (e.g., wall 314-c and the left and right walls of corridor 312-c).

Although FIG. 3 illustrates one example of an image transformation based on a history of video frames, other techniques may be used to determine an image transformation. For example, given a camera transform and a per-pixel depth value, points in world space can be computed. Each point can be assigned a color from the current color frame. Given a different camera transform, these colored points can be projected into screen space. This type of image transformation may be referred to as a reprojection. Reprojection may include, for example, skewing or otherwise adjusting the images according to a change in the position information, or pose of the camera. For example, the computer device 110 may have a per-pixel depth and color and a camera transform matrix from the previous frame, and a packet in the video stream 166 may be lost. The lost packet may corresponds to some area on the screen for which the computer device 110 now has no current data. Having the current frame transform, the computer device 110 can employ reprojection to fill in the missing area with colors from one or more previous frames. One benefit to managing camera transforms and employing reprojection is that reprojection allows all image motion in a frame due to camera movement to be factored out and expressed as a single change in pose motion, leaving only independent motion sources in the scene to be managed, transmitted, processed, etc. when not relying on the encoding exclusively. For example, with reprojection, the motion vectors described above with respect to FIG. 3 regarding the encoder may be omitted since the motion vectors 332, 334, 336 derive from player/camera movement with the rest of the scene being static. Accordingly, the reprojection may use only the camera transform unless other scene elements were moving in the corridor 312 independent of the player. The reprojection module 148 may determine the camera transform and per-pixel depth values in several ways.

Depth reconstruction is a process of reconstructing depth information from a flat 2D image (e.g., video frame 330). There are several algorithms known in the art that can reconstruct depth information from a single image, an image plus camera transform, stereo images, a sequence of images etc. This is an active area of research in image processing and robotics, and newer artificial intelligence based approaches to depth reconstruction may be used. Depth information for the scene can be cached and reused in the subsequent frames. The depth information can also be interactively refined and updated such that the reprojection module 148 maintains a representation of depth in the 3D scene. The depth information may be represented as voxels or parametric descriptions can be used. In an implementation, the camera transform matrix for a complete frame may be estimated and refined from feature observation correspondences across multiple color image frames. Additionally, a motion vector for the camera transform matrix across the frames may be determined and extrapolated for the subsequent frames.

In some implementations, the streaming server 160 may provide additional information for determining an image transformation via the client application 150. For example, the game engine 162 of the streaming server 160 may report a camera matrix 154 to the application 150 so that the streaming server 160 and the computer device 110 have an up to date understanding of the camera transform. In an implementation, the camera matrix 154 may be a 4×4 floating point matrix and may not add significantly to bandwidth consumption. In an implementation, since the bandwidth for transmitting the camera matrix 154 is small, the streaming server 160 may make redundant transmissions of the camera matrix 154 in multiple packets for a frame. Accordingly, if one of the packets containing the matrix does not arrive in time, the camera matrix 154 may be recovered from another packet in the frame. In an implementation, the application 150 may update the camera matrix 154 in parallel with the game engine 162. For example, in some games, the control commands 158 may directly control the camera matrix 154 (e.g., the control commands 158 move the virtual camera). The application 150 may update the camera matrix 154 without performing more complex game state updates and rendering operations that are performed by the streaming server 160.

The camera matrix 154, when available, may assist the streaming engine 144 in picking good motion vectors, and may also help generate motion vectors at a higher granularity both in the streaming server 160 and the computer device 110. Knowing the camera transform may also help to separate a background scene from the moving objects. That is, knowing the camera matrix 154 may make depth buffer reconstruction on the computer device 110 more robust.

Another example of additional information that may be provided by the streaming server 160 is depth information. The reprojection module 149 may use depth information from the streaming server 160 instead of relying of depth reconstruction, or may use the depth information to augment the depth reconstruction. Having ground-truth depth information on the computer device 110 may reduce the complexities of depth reconstruction. Depth buffer information, however, may add significantly to bandwidth consumption if a depth per pixel is transmitted. One technique for reducing bandwidth of the depth buffer information is to transmit only changes to the depth information after accounting for changes to camera position. As noted above, reprojection may be used to factor out camera movement.

Another example of additional information that may be provided by the streaming server 160 is geometry 156. Since the geometry of objects is unlikely to change quickly, the transmission of geometry 156 may be performed infrequently, and the information may be compressed or packed. For example, the geometry 156 may be transmitted along with video frames having few changes resulting in fewer and/or smaller packets. The client application 150 may also include geometry 156 stored at the computer device 110. For example, the client application 150 may include geometry 156 for frequently used objects.

Another example of additional information that may be provided by the streaming server 160 includes additional motion vectors beyond the motion vectors included in the video encoding. For example, motion vectors may be provided for spatial screen-space regions of a frame at various levels of granularity from coarse regions to per-pixel or sub-sample granularity. In another implementation where geometry 156 is used, motion vectors for scene geometry may be provided by the streaming server 160.

Machine learning may be used by the reprojection module 148 for image segmentation to further refine the extents of coarse motion vector information with improved extents attribution and/or to improve depth reconstruction. For example, a machine learning model such as a deep convolutional neural network may perform image classification. For instance, the neural network may perform clustering on images of the video stream to identify groups of pixels that experience the same motion vectors. The groups of pixels may represent an object having fixed depth relationships among pixels. In another example, a machine learning classifier may be trained using examples of segmentation generated by the game engine 162 in which objects are identified. The reprojection module 148 may combine course-grained motion vectors (e.g., produced by the video encoder 164 or game engine 162, which may be constrained by network bandwidth budgets for transmission) with fine-grained image segmentation executed on the client computer device 110.

Figure 4:
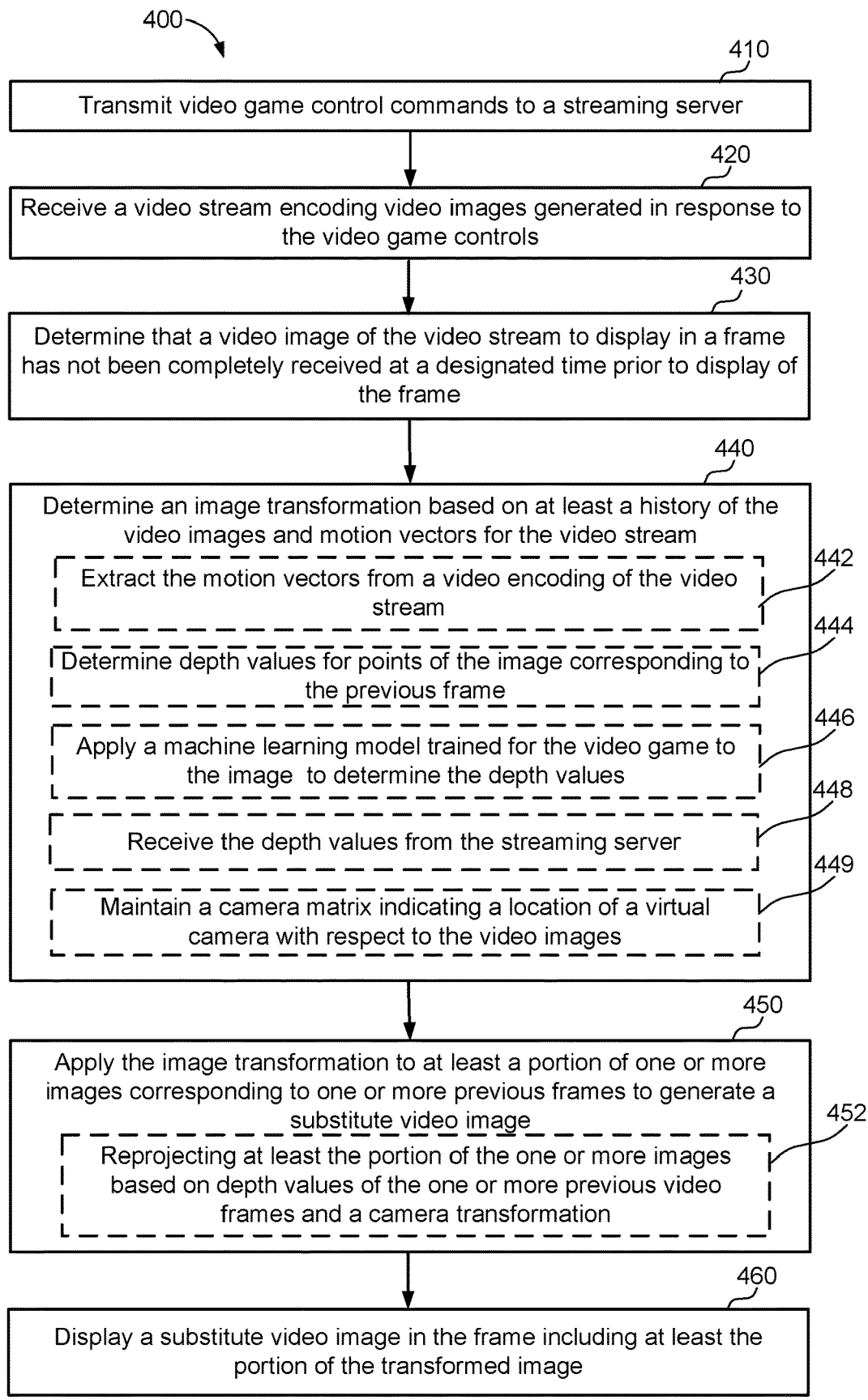
FIG. 4 is a flow chart of a method for playing a streaming video game, in accordance with an implementation of the present disclosure.

Referring now to FIG. 4, an example method 400 provides for the computer device 110 to execute a streaming video game where the streaming server 160 generates video images and streams the video images to the computer device 110. For example, method 400 may be used to reduce the effects of latency on the streaming video game when packets including the streamed video images do not arrive at the computer device 110 in time for display. The actions illustrated in method 400 may overlap in time. For example, at an instant in time, two of the actions may be performed by different components. The execution of the actions may also be interleaved on a component. Additionally, the actions illustrated in method 400 may be performed in an order other than illustrated in FIG. 4.

At 410, method 400 may include transmitting video game control commands to a streaming server. For example, the client application 150 running on computer device 110 may execute the control component 152 to transmit control commands 158 to the streaming server 160 via the network interface 124.

At 420, the method 400 may include receiving a video stream encoding video images generated in response to the video game controls. For example, the display controller 142 may execute the streaming engine 144 to receive the video stream 166 encoding video images generated in response to the control commands 158. The streaming engine 144 may receive the video stream 166 from the streaming server 160 via the network interface 124.

At 430, the method 400 may include determining that a video image of the video stream to display in a frame has not been completely received at a designated time prior to display of the frame. For example, the display controller 142 may execute the latency module 146 to determine that a video image of the video stream 166 to display in a frame has not been completely received at a designated time prior to display of the frame. For instance, at the designated time, the latency module 146 may determine whether all packets for the frame have been received, and determine that the video image has not been completely received when any packets are missing.

At 440, the method 400 may include determining an image transformation based on at least a history of the video images and motion vectors for the video stream. For example, the reprojection module 148 may determine the image transformation based on at least a history of previous frames and motion vectors for the video stream. In an implementation, the image transformation may be a reprojection. At 442, the action 440 may include extracting the motion vectors from a video encoding of the video stream. For example, the reprojection module 148 may extract the motion vectors from the video encoding of the video stream 166. At 444, the action 440 may include determining depth values for points of the image corresponding to one or more previous video frames. For example, the reprojection module 148 may determine the depth values for points of the previously displayed image or an image that was received too late to display in the previous frame. In an implementation, the reprojection module 148 may execute a depth reconstruction algorithm. In another implementation, at 448, the reprojection module 148 may receive depth information from the streaming server 160 via the application 150. In another implementation, the reprojection module 148 may apply a machine learning model trained for the video game to the image to determine the depth values. At 449, the action 440 may include maintaining a camera matrix indicating a location of a virtual camera with respect to the video images. For example, the client application 150 may maintain the camera matrix 154 indicating a location of a virtual camera with respect to the video images.

At 450, the method 400 may include applying the image transformation to at least a portion of the image corresponding to one or more previous frames to generate a substitute image. For example, the reprojection module 148 may control the GPU 120 to apply the image transformation to at least a portion of one or more images corresponding to one or more previous frames. The reprojection module 148 may send a command to the GPU 120 with the image transformation and the portion of the one or more previously displayed images to which the image transformation is to be applied. The GPU 120 may generate the substitute image by performing the image transformation on the one or more previously displayed images. At 452, the action 450 may include reprojecting at least the portion of the previous video frame based on depth values of the previous video frame and a camera transformation. For example, the GPU 120 may reproject at least the portion of the image corresponding to the previous video frame 330 based on the depth values of the previous video frame and the camera matrix 154.

At 460, the method 400 may include displaying the substitute video image in the frame, the substitute video image including at least the portion of the transformed image. For example, the display 116 may display the video frame 350 including at least the portion of the transformed image of video frame 330. The display 116 may scan out the video image from the GPU 120 via the video port 122.

Figure 5:
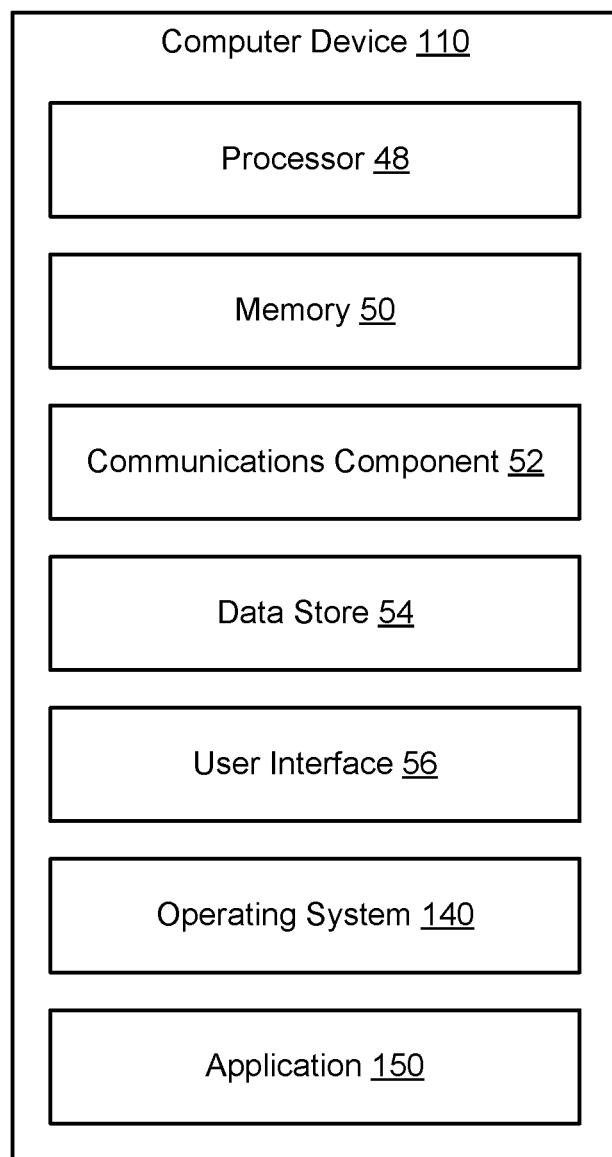
FIG. 5 is a schematic block diagram of an example computer device in accordance with an implementation of the present disclosure.

Referring now to FIG. 5, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114, and GPU 120. In an example, computer device 110 may include memory 50 for storing instructions executable by the processor 48 for carrying out the functions described herein. In an implementation, for example, memory 50 may include memory 112 and/or memory 126.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices. In an implementation, for example, communications component 52 may include network interface 124.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 (FIG. 1) and/or applications 150 (FIG. 1).

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 150. In addition, processor 48 executes operating system 140 and/or application 150, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory storing data and instructions;
a central processing unit in communication with the memory;
a network interface communicatively coupled with a communications network; and
a client application and a display control component in communication with the memory, the central processing unit, and the network interface, operable to:
transmit video game control commands to a streaming server via the network interface;
receive a video stream encoding video images generated in response to the video game control commands from the streaming server via the network interface;
determine an image transformation based on at least a history of the video images and motion vectors for the video stream;
apply the image transformation to at least a portion of one or more images corresponding to one or more previous frames to generate a substitute video image including at least a portion of a transformed previously displayed image prior to a designated time when a subsequent frame for the video stream is scheduled to arrive;
determine that a video image of the video stream to display in the subsequent frame has not been completely received at the designated time; and
display the substitute video image in the subsequent frame including at least the portion of the transformed previously displayed image instead of the video image of the video stream in response to the determination that the video image to display in the subsequent frame was not completely received at the designated time.

2. The computer device of claim 1, wherein the display control component is configured to extract the motion vectors from the encoding of the video stream.

3. The computer device of claim 1, wherein the image transformation is a reprojection of the portion of the one or more images corresponding to the one or more previous frames.

4. The computer device of claim 3, wherein the display control component is configured to determine depth values for points of the one or more images corresponding to the one or more previous frames, wherein the reprojection is based on the depth values.

5. The computer device of claim 4, wherein the display control component is configured to apply a machine learning model trained for the video game to the one or more images corresponding to the one or more previous frames to determine the depth values.

6. The computer device of claim 1, wherein the display control component is configured to apply a machine learning model to perform segmentation on the one or more images corresponding to the one or more previous frames and apply the motion vectors to identified image segments.

7. The computer device of claim 1, wherein the client application is configured to receive depth information from the streaming server.

8. The computer device of claim 1, wherein the client application is configured to maintain a camera matrix indicating a position of a virtual camera with respect to the video images, wherein the image transformation is based on the camera matrix.

9. The computer device of claim 8, wherein the client application is configured to periodically receive an updated camera matrix from the streaming server.

10. The computer device of claim 1, wherein the client application is configured to receive a geometric representation corresponding to the video images from the streaming server.

11. The computer device of claim 1, wherein the display control component is configured to:
determine whether all packets for the frame have been received at the designated time; and
determine that the video image of the video stream to display in the frame has not been completely received when any packets are missing.

12. A method for playing a streaming video game on a computer device, comprising:
transmitting video game control commands to a streaming server;
receiving, from the streaming server, a video stream encoding video images generated in response to the video game control commands;
determining an image transformation based on at least a history of the video images and motion vectors for the video stream;
applying the image transformation to at least a portion of one or more images corresponding to one or more previous frames to generate a substitute video image including at least a portion of a transformed previously displayed image prior to a designated time when a subsequent frame for the video stream is scheduled to arrive;
determining that a video image of the video stream to display in the subsequent frame has not been completely received at the designated time; and
displaying the substitute video image in the subsequent frame including at least the portion of the transformed previously displayed image instead of the video image of the video stream in response to the determination that the video image to display in the subsequent frame was not completely received at the designated time.

13. The method of claim 12, wherein determining the image transformation comprises extracting the motion vectors from the encoding of the video stream.

14. The method of claim 12, wherein the image transformation is a reprojection of the portion of the one or more images corresponding to the one or more previous frames.

15. The method of claim 14, wherein determining the image transformation comprises determining depth values for points of the one or more images corresponding to the one or more previous frames, wherein the reprojection is based on the depth values.

16. The method of claim 15, wherein determining the depth values comprises applying a machine learning model trained for the video game to the one or more images corresponding to the one or more previous frames to determine the depth values.

17. The method of claim 12, wherein determining the image transformation comprises maintaining a camera matrix indicating a location of a virtual camera with respect to the video images, wherein the image transformation is based on the camera matrix.

18. The method of claim 17, wherein maintaining the camera matrix comprises periodically receiving an updated camera matrix from the streaming server.

19. The method of claim 12, wherein determining the image transformation comprises:
receiving a geometric representation corresponding to the video images from the streaming server; and
rendering the geometric representation to determine depth values.

20. A computer-readable medium, comprising code executable by one or more processors for playing a streaming video game on a computing device, the code comprising code for:
transmitting video game control commands to a streaming server;
receiving, from the streaming server, a video stream encoding video images generated in response to the video game control commands;
determining an image reprojection based on one or more images of the video stream corresponding to one or more previous frames and motion vectors selecting based on a camera transformation matrix for the one or more previous frames;
applying the image reprojection to at least a portion of the one or more images of the video stream corresponding to one or more previous frames to generate a substitute video image including at least a portion of a reprojected image prior to a designated time when a subsequent frame for the video stream is scheduled to arrive;
determining that a video image of the video stream to display in the subsequent frame has not been completely received at the designated time; and
displaying the substitute video image in the subsequent frame including at least the portion of the reprojected image instead of the video image of the video stream in response to the determination that the video image to display in the subsequent frame was not completely received at the designated time.

21. The computer-readable medium of claim 20, wherein the code for determining the image reprojection includes code for determining depth values for points of the one or more images corresponding to the one or more previous frames, wherein the image reprojection is based on the depth values.

* * * * *